Aug. 6, 1946.    J. FLEISCHER    2,405,298
TWIST DRILL
Filed April 20, 1944
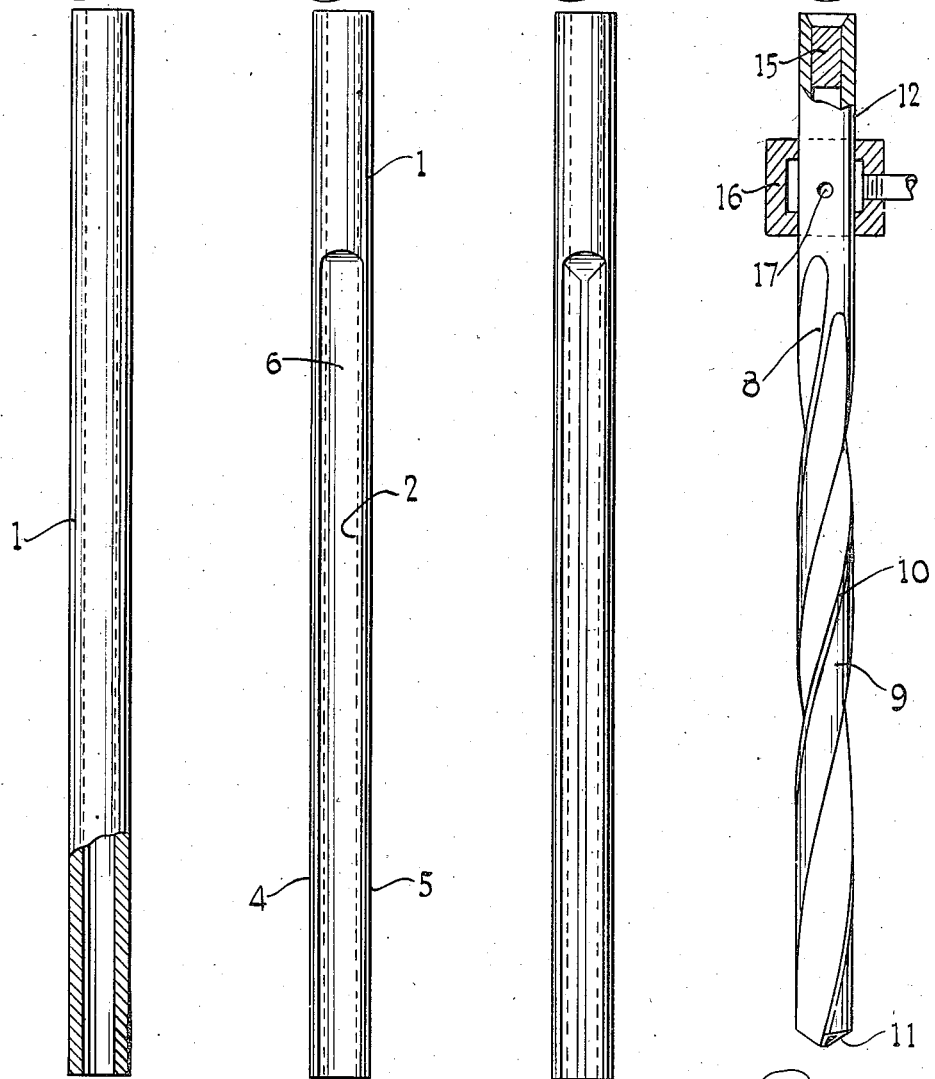
INVENTOR.
JOHN FLEISCHER
BY Hammond & Littell
ATTORNEYS Patented Aug. 6, 1946

2,405,298

UNITED STATES PATENT OFFICE 2,405,298

TWIST DRILL

John Fleischer, Van Dyke, Mich.

Application April 20, 1944, Serial No. 531,878

8 Claims. (Cl. 76—108)

This invention relates to the production of lubricated twist drills.

In the usual production of twist drills which are lubricated by forcing a lubricant through the shank of the drill and out at the cutting tip, it has been customary to produce the drills from a solid steel bar which is first drilled or grooved to produce the channel for the lubricant, then machined or milled down to produce the relieved or valley portions of the drill, and then twisted, sharpened, etc. The production of a lubricated drill from a solid bar of steel in this manner requires a large amount of steel and considerable work, so that drills of this type are unduly expensive. Inasmuch as such drills are also subject to a high degree of breakage, the cost of drilling with lubricated high speed drills is unnecessarily high.

It is an object of the present invention to produce a superior lubricated high speed twist drill at a lower cost in both materials and labor and to produce a drill which will be stronger and less subject to breakage than the lubricated high speed twist drills as produced at the present time.

It is another object of the invention to produce a lubricated high speed twist drill from hollow tubing to thereby reduce the cost of the metal going into the drill and also reduce the amount of labor necessary to produce the drill.

Another object of the invention is to provide a lubricated high speed twist drill from hollow tubing which will be stronger than the lubricated high speed twist drills produced from solid steel bars.

Various other objects and advantages of the invention will appear as this description proceeds.

The production of a lubricated high speed twist drill from hollow steel tubing according to the invention herein described has many advantages over the production of such a drill from bar stock. The hollow tube does not have to be drilled or channeled to provide the lubricant duct and the hollow tube may be shaped easier than bar stock. Also, the hollow tube may be made into a drill which is of substantially equal strength to the strength of a bar stock drill, and as the cost of the hollow tube drill is materially lower than the cost of the bar stock drill, breakage of drills becomes a less important item in drilling costs.

In the accompanying drawing, which shows a preferred embodiment of the drill and the various steps in the manufacture:

Figure 1 is a side view partially in section of a piece of hollow steel tubing suitable for the manufacture of a lubricated twist drill according to my invention;

Figure 2 is an end view of the tube illustrated in Figure 1;

Figure 3 is a side view of the tube illustrated in Figure 1, showing the first step in the manufacturing operations;

Figure 4 is an end view of the tube illustrated in Figure 3;

Figure 5 is a side view showing another stage in the manufacturing operation;

Figure 6 is an end view of the tube illustrated in Figure 5;

Figure 7 is a side view of the finished drill; and

Figure 8 is an end view thereof.

In the embodiment illustrated, the drill is produced from a section of hollow tubing 1, which will be of the desired length and diameter and has the configuration shown in Figure 2. The tube of Figure 1 is preferably a piece of high speed steel tubing. Due to the way in which it has been manufactured, the walls of the tubing have been worked in the drawing and rolling operation by which the tube is formed so as to produce strong metal throughout the walls.

The first step in the manufacture of the hollow lubricated twist drill according to my invention involves the milling of relief sections 2 and 3 on opposite sides of the tube 1. The milled sections are shown in Figures 3 and 4 of the drawing. This milling is done in such a way as to leave the metal in the portions 4 and 5 of the tube walls unreduced in thickness and therefore of the same strength and thickness as the original walls of the tube.

The next step in the formation of the drill is illustrated in Figures 5 and 6. In this step the metal 6 and 7, remaining in the reduced portion of the tube wall after the sections 2 and 3 have been milled out, is deformed by pressing to bring the metal portions 6 and 7 together as indicated at 7a and leave the unreduced metal portions 4 and 5 of the original strength. The deformation of the metal in the sections 6 and 7 from the form shown in Figure 4 to the form shown in Figure 6 may be done by a punching operation or by rolling or otherwise.

It will be noted that the metal in sections 6 and 7 is not stretched or elongated in any way in moving it from the position shown in Figure 4 to the position shown in Figure 6 and that the metal in parts 6 and 7 in Figure 6 acts to reinforce the metal in sections 4 and 5 so as to increase rather than decrease the strength of sections 4 and 5.

As shown by the lines A, B and C in Figure 6, the milling or cutting from the walls of the tube to produce the reduced sections 6 and 7 has been done in such a way that the line A passing through the top of section 6, before displacement of this section, is the same distance from the line B which passes through the intersection of section 6 with the unreduced sections 4 and 5 as the line C which passes through to top of section 6 in displaced position. By thus forming the sections 6 and 7 so that the displacement below the line B is the same distance as these parts are above the line B before displacement, no strain or distortion is put upon the sections 6 and 7 or the sections 4 and 5 in the displacing operation, thus insuring strong, unstrained metal in all these parts.

When the tube has been shaped to the form shown in Figures 5 and 6, it is then twisted in the usual manner to form the twisted or spiral relief sections 8 and the lands 9. The lands 9 may subsequently be ground down to form the raised cutting portion 10 which can be sharpened to cut the sides of the hole being drilled, and the end 11 is sharpened in the usual way to produce cutting edges at the end of the drill. In these operations the original passage through the center of tube 1 remains open in the shank portion 12 of the drill and is closed by the pressing of the sections 6 and 7 together to form two passages 13 and 14 to the tip of the drill through which lubricant may flow. The upper end of the shank 12 may be closed with a metal plug 15 to provide the strength necessary for securing the drill in the holder, and a hollow collar 16 communicating with the lubricant opening 17 through the walls of the drill may be mounted on the drill in such a way as to permit the drill to rotate therein and permit lubricant to be forced into the drill during the drilling operation.

In forming a drill in this manner, the wall thickness and strength of metal in the original tube remains substantially undiminished in the sections 4 and 5 of the tube wall, and in the portions 6 and 7 which remain after the relief has been milled into the tube, the metal is not stretched or distorted but merely displaced from the position shown at the start of the punching operation in Figure 4 to the position shown at the end of the punching operation in Figure 6.

The central portion in which the metal in the sections 6 and 7 comes together may be welded for extra strength if desired. The drill so described is cheaper to manufacture than similar lubricated twist drills made from bar stock and is of equal or greater strength than the usual bar stock drill.

While a specific embodiment has been described, it will be understood that the drill may be formed from either high speed tubing, high speed bar stock drilled to form a tube, or high speed flat stock rolled and welded to form a tube or any other tubular form.

While I have described and illustrated a specific embodiment of my invention, it will be understood that various modifications and changes may be made therein without departing from the spirit of my invention within the scope of the following claims.

I claim:

1. The method of making a lubricated twist drill from tube stock which comprises cutting relief sections of reduced diameter and substantially uniform wall thickness on each side of the tube while leaving other sections of the tube wall of unreduced thickness, displacing the relief sections so as to bring the metal in the relief sections together at the center of the tube and leave sharp corners between the relief sections and the original outside circumference of the tube, twisting the so formed tube to form the spiral and sharpening the formed drill.

2. The method of making a lubricated twist drill from tube stock which comprises cutting relief sections of reduced outside diameter and substantially uniform thickness from side to side of the reduced section on each side of the tube while leaving other sections of the tube wall of unreduced thickness and with the unreduced portions of greater outside arc than the corresponding inside arc, displacing the cut sections so as to bring the metal in the cut sections together at the center of the tube and leave sharp corners between the cut sections and the original outside circumference of the tube without increasing the length of the cut sections, twisting the so formed tube to form the spiral and sharpening the formed drill.

3. The method of making a lubricated twist drill from tube stock which comprises cutting relief sections of reduced outside diameter and substantially uniform wall thickness on each side of the tube and pressing the metal of the relief sections inwardly to form valleys while leaving the metal outside the cut sections unreduced in thickness to form lands, twisting the formed tube, sharpening the end of the tube and reducing the lands back of the leading edge thereof.

4. The method of making a twist drill from tube stock which comprises cutting relief sections of reduced outside diameter and substantially uniform thickness from side to side of the reduced section on opposite sides of the tube while leaving other sections of the tube wall of unreduced thickness with the outside arc of the unreduced portion of greater length than the corresponding inside arc, pressing the metal in the relief sections together and welding at the points of contact, twisting the formed tube and sharpening to form a drill.

5. A twist drill of the type described consisting of a twisted hollow tube having two sections of substantially unreduced thickness from the thickness of the original tube walls, said sections being opposite each other and forming lands and having two cut relief sections of reduced and substantially uniform thickness from side to side thereof opposite each other forming valleys for the drill with the said relief sections deformed so as to contact with each other at substantially the center of the tube in the finished drill, said drill having sharp corners where the sides of the unreduced sections meet the valleys of the drill.

6. A lubricated twist drill of the type described consisting of a twisted hollow tube having two sections of substantially unreduced thickness from the thickness of the original tube wall forming lands and having two cut relief sections of reduced but substantially uniform thickness from side to side thereof forming valleys for the drill with the said relief sections deformed so as to contact with each other in the finished drill, the length of the relief sections between the sections of unreduced thickness being the same after deformation as it was before deformation, and the sections of reduced thickness forming sharp corners with the relief sections.

7. A twist drill comprising a twisted hollow tube having wall sections of different thickness opposite each other, the thinner wall sections being of substantially uniform thickness from side to side thereof and having the same inner diameter as the inner diameter of the tube, and a smaller outer diameter than the outer diameter of the tube, and being pressed inwardly to contact at the center of the tube and form relief sections of the drill, the thicker wall sections having sharp corners and forming lands of the drill.

8. A lubricated hollow twist drill comprising a twisted hollow tube having two wall sections of the thickness of the original tube and two wall sections of reduced and substantially uniform thickness from side to side thereof and smaller radius than the outer radius of the original tube with the wall sections of reduced thickness pressed inwardly to contact with each other and to form the relief sections of the drill, and the thicker wall sections having sharp corners and forming the lands of the drill.

JOHN FLEISCHER.